United States Patent
Mellem

Patent Number: 5,743,933
Date of Patent: Apr. 28, 1998

[54] APPARATUS AND METHOD FOR DEFIBRATING OPTICALLY DENSE GLASS MELTS

[75] Inventor: Joachim Mellem, Hockenheim, Germany

[73] Assignee: ISOVER Saint-Gobain, Courbevoie, France

[21] Appl. No.: 433,448

[22] PCT Filed: Aug. 23, 1994

[86] PCT No.: PCT/EP94/02786

§ 371 Date: Oct. 24, 1995

§ 102(e) Date: Oct. 24, 1995

[87] PCT Pub. No.: WO95/07242

PCT Pub. Date: Mar. 16, 1995

[30] Foreign Application Priority Data

Sep. 10, 1993 [DE] Germany ............ 43 30 797.3

[51] Int. Cl.$^6$ ................... C03B 5/16; C03B 7/07
[52] U.S. Cl. ........... 65/474; 65/134.1; 65/135.1; 65/135.6; 65/346; 65/347; 65/356; 373/27
[58] Field of Search ................. 65/346, 347, 335, 65/356, 134.1, 135.1, 135.6, 135.7, 135.8, 384, 376, 474, 475, 488; 373/27, 30, 39, 41

[56] References Cited

U.S. PATENT DOCUMENTS

| | | | |
|---|---|---|---|
| 1,928,288 | 9/1933 | Henry | 65/135.1 |
| 2,119,949 | 6/1938 | Blau et al. | 65/356 |
| 3,294,517 | 12/1966 | Fraser et al. | |
| 3,326,655 | 6/1967 | Penberthy | 65/347 |
| 3,388,204 | 6/1968 | Ellis | 65/356 |
| 3,573,017 | 3/1971 | Griem, Jr. | 65/384 |
| 3,891,422 | 6/1975 | Froberg et al. | 65/346 |
| 3,999,972 | 12/1976 | Brax | 65/346 |
| 4,023,950 | 5/1977 | Glaser | 65/135.1 |
| 4,027,091 | 5/1977 | Pieper . | |
| 4,515,614 | 5/1985 | Barkhau et al. | 373/41 |
| 4,737,178 | 4/1988 | Reifschneider et al. | 65/384 |
| 4,812,151 | 3/1989 | Sheinkop et al. | 65/384 |

FOREIGN PATENT DOCUMENTS

| | | |
|---|---|---|
| 2461700 | 7/1976 | Germany . |
| 3528332 A1 | 2/1987 | Germany . |

*Primary Examiner*—Steven P. Griffin
*Attorney, Agent, or Firm*—Cushman Darby & Cushman, IP Group of Pillsbury Madison & Sutro LLP

[57] ABSTRACT

An apparatus for defibrating optically dense glass melts, such as a glass melt from basalt by the jet process, is proposed which is equipped with a feeding mechanism (1) for the melt and defibrating aggregates (2), the feeding mechanism (1) having a feed channel (3) and a subsequent distributing channel (4) with outlet ports (5) to the defibrating aggregates (2). To homogenize the glass temperature in the area before the defibrating aggregates (2) the feed channel (3) has on the bottom side at least in the area adjacent the distributing channel (4) a warming device (8) serving as a thermal barrier or active insulation and advantageously formed as an electric resistance heating device.

9 Claims, 1 Drawing Sheet

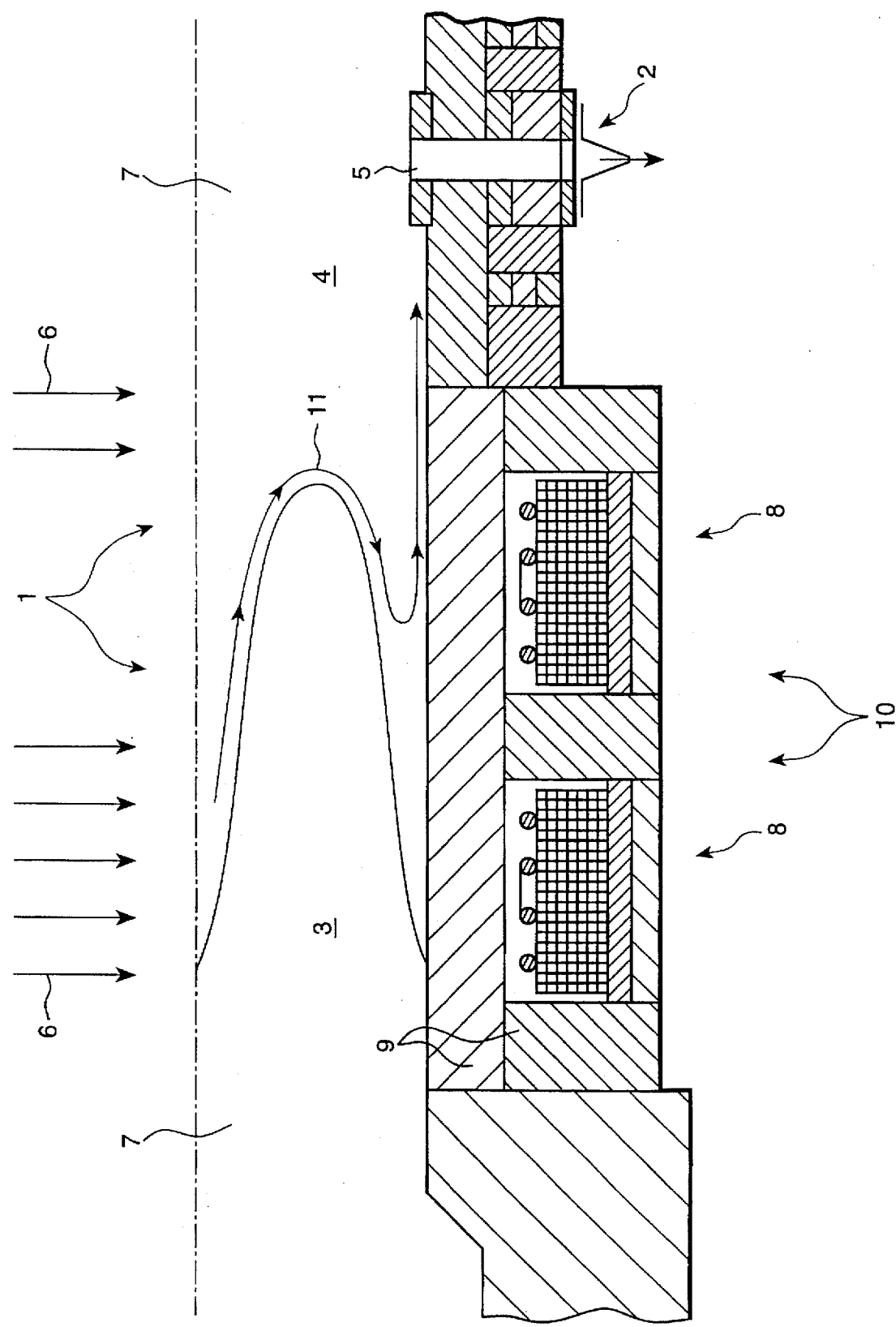

APPARATUS AND METHOD FOR DEFIBRATING OPTICALLY DENSE GLASS MELTS

BACKGROUND OF THE INVENTION

1. Field of the Invention

The present invention relates to an apparatus for defibrating optically dense glass melts, such as a glass melt from basalt by the jet process, having feeding means (or "feeders") for the melt and defibrating aggregates, the feeding means having a feed channel and a subsequent distributing channel with outlet ports to the defibrating aggregates, and the melt being heatable from the surface. The present invention further relates to a corresponding method for applying the inventive apparatus.

2. Description of Prior Art

Apparatus and methods of the type in question have been known for years from practice and are used for producing mineral wool. To prevent the melt flowing to the defibrating aggregates or jets, which are usually in linear arrangement, from cooling off the melt is heated from the surface, this generally being done by hot gas.

With respect to the resulting temperature distribution in the melt stream it is essential that the heat transfer by radiation plays a much smaller part with optically dense or approximately dense glass than with clear glass. With optically dense glass, which includes basalt melts, the thermal transport to the bottom of the feeding means takes place almost solely by thermal conduction. The result is that a considerable temperature difference arises in the melt between the melt surface and the bottom of the feeding means, this difference being in turn dependent on the quality of the bottom insulation in the feeding means, or rather the feed channel. It has thus turned out in practice that the melt flowing through the feed channel has a vertical temperature gradient of up to 20° per cm of melt height. This enormous temperature gradient affects the flow behavior of the melt stream, which is due to the pronounced temperature-dependent march of viscosity. A vertical velocity profile of the melt stream consequently arises, so that the melt located on the top in the feed channel, which is heated from above, flows faster than the melt near the bottom of the feed channel.

Furthermore the mass flowing through the feed channel, which is often referred to as the glass power, itself influences the temperature distribution. At high glass power, i.e. a high glass throughput through the feed channel, the abovementioned temperature gradient is lower, which is due to a shorter sojourn time within the feed channel. However the vertical temperature gradient increases toward the bottom of the feed channel.

The result of the abovementioned influences is that the defibrating aggregrates usually disposed in linear succession are supplied with melt of different temperature. The temperature differences in the melt occurring at the defibrating aggregates are sometimes so high that the operation of the first defibrating aggregate is interrupted by discontinuation of the melt flow due to a temperature decreasing toward the bottom, while the last defibrating aggregate is usually operated at the limit of maximum flow due to overheating. Power differences of up to 100% based on the glass throughput can consequently be detected. This in turn results in different qualities of the wool produced by the successive defibrating aggregrates e.g. by the jet process, which are unacceptable.

There have been attempts in the past to solve the above-described problem of interrupted operation of the first defibrating unit by discontinuation of the glass flow, which is also referred to as falling asleep, in different ways. For example DE-C 29 35 416 proposes an apparatus for uniformly heating a glass stream in a feeder wherein electric heating means leading through the melt stream, among other places, are to ensure a horizontal temperature balance in the feeder. The electric energy is often guided directly through the melt. Due to different temperatures, however, the melt has different conductances, the conductance increasing at a higher melt temperature. Primarily the already hotter melt is consequently heated even further, which is precisely what was to be avoided. This counteracts a homogenization of temperature, i.e. the vertical temperature gradient is largely retained.

SUMMARY OF THE INVENTION

The present invention is therefore based on the problem of providing both an apparatus and a method for defibrating optically dense glass melts, such as a glass melt from basalt by the jet process or other methods, wherein a homogenization of the melt temperature occurs in the area before the defibrating aggregates so that a vertical temperature gradient is at least largely avoided. A corresponding method is further stated.

The inventive apparatus solves the above problem by apparatus designed in such a way that a warming device serving as a thermal barrier or active insulation is associated with the feed channel—on the bottom side—at least in the area adjacent the distributing channel, whereby the term "warming device" refers to a device that both keeps warm and slightly heats—if necessary—in the manner of an additional heating device.

It was found according to the invention that the abovementioned problem lies in the temperature drop toward the bottom. In a next step it was found that this problem can be fundamentally remedied by warming at least the bottom of the feed channel in the area adjacent the distributing channel in such a way that it acts as a kind of active insulation. This refers to heating to such an extent as to at least largely avoid cooling toward the bottom in the melt flowing within the feed channel, by heat transition. Finally it was found that such active insulation acts like a thermal barrier against the flow of colder melt since, when cooling is avoided across a sufficiently large area of the feed channel bottom, the melt flowing faster due to differences in viscosity flows from the middle or upper layers to the bottom, while the colder, slower-flowing melt more or less stops at the beginning of the warming zone. Consequently a vertical homogenizing of temperature is obtained in the melt directly before the first defibrating aggregate so that a discontinuation of the melt flow of the first defibrating aggregate is excluded by avoiding a lower melt temperature arising in the bottom area.

The inventive apparatus accordingly achieves a vertically oriented, cascade-like rolling effect within the melt so as to ensure that the warmer, upper temperature layers of the melt spread fast in the direction of transport. Since the otherwise viscous bottom layer can no longer creep across the first, or,.even several, defibrating aggregates or jets but already heats up before the first defibrating aggregate due to heating and liquefaction, the term "thermal barrier" introduced above is justified.

The warming device claimed as inventive could be disposed advantageously within the feed channel on its bottom so that the melt flows directly over the warming device. It could also be integrated in the walling of the feed channel so that it is protected by the walling and thus has no direct contact with the melt. It is also conceivable to dispose the warming device below the feed channel, preferably directly on its outer walling, the outer walling usually being made of a ceramic material referred to as "bottom stone".

In comparison to conventional apparatus of the type in question, the area of the feed channel having the warming device could be formed as an elongation of the conventional feed channel adjacent the actual distributing channel. A kind of warming plate would accordingly be inserted between feed channel and distributing channel, over which the melt stream passes from the actual feed channel into the distributing channel.

With respect to a specific design of the warming device it is advantageous in particular with respect to a simple constructional design to form it as an electric heating device. Specifically, it could be a heating element preferably designed as a resistance heating element, whereby the latter can be designed as a resistance wire, heating resistor or tubular heating element. In particular if the warming device is disposed within the feed channel on its bottom it is recommendable to use a tubular heating element since this element, due to its coaxial arrangement of the actual heat conductor, is at least largely protected against outside influences by the outer tube and the ceramic insulation located therein.

To guarantee a sufficiently large warming path it is advantageous to dispose and design one or more heating elements in the direction of melt flow in such a way that their minimum heating capacity at least largely corresponds to the heat emission from the feed channel downward. In other words, the warming device in the form of an additional heating device is not for originally heating the melt but rather for avoiding a heat emission to the walling of the feed channel or to the surroundings. Consequently the capacity of the warming device could be designed just so as to compensate the actual heat emission to the outside.

With respect to the inventive method the abovementioned problem is also solved. The feed channel, or the melt, is accordingly heated on the bottom side at least in the area adjacent the distributing channel to compensate heat losses. It was also found within the framework of the inventive method that the heat losses causing the abovementioned problems can be compensated by a kind of "active insulation", namely by additionally heating the bottom area of the feed channel causing the heat losses. The capacity of the bottom heating is advantageously designed just so as to at least largely avoid a downward directed heat emission from the feed channel.

There are different possibilities for advantageously designing and developing the teaching of the present invention. Reference is made to the following explanation of an embodiment example of the invention with reference to the drawing. Generally preferred designs and developments of the teaching will also be explained in conjunction with the explanation of the preferred embodiment example of the invention with reference to the drawing.

BRIEF DESCRIPTION OF THE DRAWING

In the drawing the single FIGURE shows schematically and in part a longitudinal section of an embodiment example of an inventive apparatus for defibrating a basalt or glass melt by the jet process, showing only the feeding means and the first defibrating aggregate as well as the march of temperature in the melt stream.

DESCRIPTION OF THE PREFERRED EMBODIMENTS

The apparatus shown in the single FIGURE has substantially feeding means 1 and defibrating aggregrates 2 or jets. Feeding means 1 in turn include feed channel 3 and subsequent distributing channel 4 with outlet ports 5 to defibrating aggregates 2. Arrows 6 indicate that melt 7 is heatable by gas from the surface.

According to the invention, warming device 8 in the form of an additional heating device and serving as a thermal barrier or active insulation is associated with feed channel 3 on the bottom side in the area adjacent distributing channel 4. In the embodiment example selected here, additional heating device 8 is integrated or received in walling 9 of feed channel 3. The FIGURE further shows clearly that the area of feed channel 3 having additional heating device 8 is formed as an elongation 10 of conventional feed channel 3 adjacent distributing channel 4.

Additional heating device 8 shown is designed as an electric heating device which has a relatively low heating capacity, more precisely as a resistance heating element, altogether two resistance heating elements being disposed successively in the direction of melt flow. This realizes a sufficient warming path, the capacity of additional heating device 8 being designed in such a way as to at least largely exclude a downward directed heat emission from feed channel 3.

Along with the specific constructional design the single FIGURE further shows melt stream 11 which results due to differences in viscosity of faster-flowing melt 7. In accordance with melt stream 11 shown, faster-flowing melt from the middle or upper layers flows around cooler areas of melt 7 to the bottom, while colder, slow-flowing melt 7 almost stops at the beginning of the heating surface or in the area of additional heating device 8. A temperature balance consequently takes place in the melt in the area before first defibrating aggregate 2, at least largely eliminating the formerly vertical temperature gradient. This effectively avoids a discontinuation of flow of melt 7 in the area of first defibrating aggregate 2, thereby excluding power differences at the individual defibrating aggregates. This ultimately ensures a sufficiently homogeneous quality of the wool produced with the inventive apparatus and by the inventive method.

Finally it should be emphasized that the present invention is not limited to glass melts defibrated by the jet process. It is also advantageously applicable for example with glass melts defibrated by the so-called TEL method (centrifugal drum principle).

I claim:

1. An apparatus for defibrating optically dense glass melts comprising, a glass melt feeding mechanism for feeding an optically dense glass melt having warmer, faster-flowing, upper layers and colder, slow-flowing, lower layers;

said glass melt feeding mechanism comprising a feed channel having a bottom side, a distributing channel positioned and arranged adjacent to said feed channel, and outlet ports positioned and arranged within said distributing channel;

defibrating aggregates positioned and arranged to receive said glass melt from said outlet ports;

at least one warming device positioned and arranged to extend over an area of said bottom side of said feed channel, said area of said bottom side of said feed channel being adjacent to said distributing channel; and wherein said at least one warming device is constructed and arranged for warming said bottom side of said feed channel so as to substantially stop said colder, slow-flowing, lower layers of said optically dense glass melt in an area of said bottom side of said feed channel which is adjacent to said at least one warming device and for creating a cascading rolling flow in said glass melt which leads said warmer, faster-flowing, upper layers of said optically dense glass melt toward said bottom side of said feed channel to achieve vertical homogenization of glass melt temperature prior to said optically dense glass melt being received by said defibrating aggregates so as to prevent discontinuation of flow of said glass melt in said defibrating aggregates.

2. The apparatus of claim 1, wherein said at least one warming device is disposed within said feed channel.

3. The apparatus of claim 1, wherein said at least one warming device is integrated in a side wall of said feed channel.

4. The apparatus of any of claims 1 to 3, wherein said at least one warming device comprises an electric heating device with a relatively low heating capacity.

5. The apparatus as in claim 4, wherein the area of said bottom side of the feed channel having the at least one warming device is formed as an elongation of said feed channel adjacent said distributing channel.

6. The apparatus as in claim 4, wherein said at least one warming device comprises an electric heating device with at least one heating element having a minimum heating capacity corresponding to a downward directed heat emission from said feed channel.

7. The apparatus of claim 6, wherein said at least one heating element comprises at least two resistance heating elements which are disposed successively over said area of said bottom side of said feed channel in a direction of melt flow within said glass melt feeding mechanism.

8. A method for defibrating an optically dense glass melt, comprising the steps of:

melting optically dense glass to form an optically dense glass melt having warmer, faster-flowing, upper layers and colder, slow-flowing, lower layers;

feeding the optically dense glass melt along a feed channel having a bottom side directed toward a distributing channel having outlet ports therein which lead the glass melt to defibrating aggregates;

warming the bottom side of the feed channel with at least one warming device to substantially stop said colder, slow-flowing, lower layers of said optically dense glass melt in an area of said bottom side of said feed channel which is adjacent said at least one warming device and to create a cascading rolling flow in said glass melt which leads said warmer, faster-flowing, upper layers of said optically dense glass melt toward said bottom side of said feed channel to achieve vertical homogenization of glass melt temperature; and feeding said glass melt which has achieved said vertical homogenization of glass melt temperature to said distributing channel and out said outlet ports to said defibrating aggregates for defibrating said optically dense glass melt.

9. The method of claim 8, wherein the step of warming the bottom side of the feed channel provides sufficient heat to the bottom side of the feed channel which corresponds to downward directed heat emission from said feed channel.

* * * * *